US012734674B2

(12) United States Patent
Yasuda et al.

(10) Patent No.: US 12,734,674 B2
(45) Date of Patent: Sep. 15, 2026

(54) WORKPIECE SUPPLY SYSTEM

(71) Applicant: DMG MORI CO., LTD., Nara (JP)

(72) Inventors: Hiroshi Yasuda, Nara (JP); Tomoaki Yoda, Nara (JP); Koji Tanaka, Nara (JP); Hiromitsu Nakaoka, Nara (JP)

(73) Assignee: DMG MORI CO., LTD., Nara (JP)

( * ) Notice: Subject to any disclaimer, the term of this patent is extended or adjusted under 35 U.S.C. 154(b) by 306 days.

(21) Appl. No.: 18/575,189

(22) PCT Filed: Jul. 8, 2021

(86) PCT No.: PCT/JP2021/025729
§ 371 (c)(1),
(2) Date: Dec. 28, 2023

(87) PCT Pub. No.: WO2023/281686
PCT Pub. Date: Jan. 12, 2023

(65) Prior Publication Data
US 2024/0351188 A1 Oct. 24, 2024

(51) Int. Cl.
*B25J 5/00* (2006.01)
*B23Q 7/04* (2006.01)
(Continued)

(52) U.S. Cl.
CPC ................ *B25J 5/007* (2013.01); *B23Q 7/04* (2013.01); *B23Q 7/10* (2013.01); *B25J 9/0009* (2013.01); *B25J 9/1697* (2013.01)

(58) Field of Classification Search
CPC ... B23Q 7/10; B23Q 17/00; B23Q 7/04; B25J 9/1697; B25J 19/023; B25J 5/007;
(Continued)

(56) References Cited

U.S. PATENT DOCUMENTS 7,101,137 B2 * 9/2006 Schwarz .................. B23Q 7/14 414/222.01
8,282,333 B2 * 10/2012 Oda ....................... B23Q 7/005 414/751.1
(Continued)

FOREIGN PATENT DOCUMENTS

JP 2010064198 A 3/2010
JP 2015085458 A 5/2015
(Continued)

OTHER PUBLICATIONS

Mokadem et al., Verification of a timed multitask system with UPPAAL, 2005, IEEE, pg., 1-8 (Year: 2005).*
(Continued)

*Primary Examiner* — Mcdieunel Marc

(57) ABSTRACT

A workpiece supply system for supplying a workpiece to a target device includes: a robot mount carriage including a manually-moved carriage having a plurality of wheels, a robot mounted on the carriage, and a controller controlling the robot; and a manually-moved workpiece storage carriage having a plurality of wheels and including a workpiece storage storing the workpiece. One of the robot mount carriage and workpiece storage carriage includes one of a pair of associators for associating them with each other, and the other of the robot mount carriage and workpiece storage carriage includes the other of the pair of associators. The pair of associators consists of a camera provided on the robot and an identifier provided on the workpiece storage carriage or consists of an engaged body provided on one of the robot and workpiece storage carriage and an engaging body provided on the other of the robot and workpiece storage carriage.

7 Claims, 10 Drawing Sheets

(51) Int. Cl.
*B23Q 7/10* (2006.01)
*B25J 9/00* (2006.01)
*B25J 9/16* (2006.01)

(58) Field of Classification Search
CPC ............. B25J 9/0009; G05B 19/41825; G05B 2219/45063; G05B 2219/40298; G05B 2219/40584
See application file for complete search history.

(56) References Cited

U.S. PATENT DOCUMENTS

| | | | | |
|---|---|---|---|---|
| 8,308,419 | B2 * | 11/2012 | Nihei | B25J 9/0009 414/735 |
| 11,557,223 | B2 * | 1/2023 | Bronstrup | G09B 19/24 |
| 11,932,129 | B2 * | 3/2024 | Kalouche | B65G 1/0464 |
| 2013/0309055 | A1 * | 11/2013 | Yoshinaga | B25J 9/0009 414/680 |
| 2018/0093380 | A1 * | 4/2018 | Yoshida | B25J 9/1697 |
| 2018/0185974 | A1 * | 7/2018 | Lachenmeier | B23Q 7/1442 |
| 2018/0314265 | A1 * | 11/2018 | Matsuno | G05D 1/0246 |
| 2018/0338397 | A1 * | 11/2018 | Vangal-Ramamurthy | B25J 9/023 |
| 2018/0370038 | A1 * | 12/2018 | Isaac | B25J 19/023 |
| 2019/0331620 | A1 * | 10/2019 | Troy | G01S 17/08 |
| 2022/0362869 | A1 * | 11/2022 | Reed | B23G 1/24 |
| 2022/0362896 | A1 * | 11/2022 | Kienberger | B23Q 7/046 |
| 2024/0261909 | A1 * | 8/2024 | Akey | B25J 11/005 |

FOREIGN PATENT DOCUMENTS

| | | | |
|---|---|---|---|
| JP | 2016221622 | A | 12/2016 |
| JP | 2018058142 | A | 4/2018 |
| JP | 2018511372 | A | 4/2018 |
| JP | 3217417 | U | 8/2018 |
| JP | 2021074791 | A | 5/2021 |
| JP | 2021094634 | A | 6/2021 |
| WO | 2018092222 | A1 | 5/2018 |
| WO | 2020138032 | A1 | 7/2020 |

OTHER PUBLICATIONS

Niculescu et al., Understanding welding practices on shipyards: an ethnographic study for designing an interactive robot welder, 2014, IEEE, pg., 1-6 (Year: 2014).*
Wu et al., Automated bead layout methodology for robotic multi-pass welding, 2015, IEEE, pg., 1-4 (Year: 2015).*
Elghoneimy et al., Agent-Based Decision Support and Simulation for Wood Products Manufacturing, 2012, IEEE, pg., 1656-1668 (Year: 2012).*
Borenstein et al., Obstacle avoidance with ultrasonic sensors, 1988, IEEE, p. 213-218 (Year: 1988).*
Halt et al., AMADEUS—A robotic multipurpose solution for intralogistics, 1988, IEEE, pg., 371-376 (Year: 1988).*
Choi et al., Trends and opportunities for robotic automation of trim & final assembly in the automotive industry, 2010, IEEE, p. 124-1129 (Year: 2010).*
Teller et al., A voice-commandable robotic forklift working alongside humans in minimally-prepared outdoor environments, 2010, IEEE, p. 526-533 (Year: 2010).*
Kamm, Manufacturing, 1995, IEEE, p. 229-23 (Year: 1995).*
Nitzan, Development of intelligent robots: Achievements and issues, 1985, IEEE, p. 3-13 (Year: 1985).*
Afanasev et al., Machine Vision for Auto Positioning in the Modular Industrial Equipment: A Case Study, 2020, IEEE, p. 113-229 (Year: 2020).*
Hoffman et al., A multi-track elevator system for E-commerce fulfillment centers, 2017, IEEE, p. 4694-4701 (Year: 2017).*
International Search Report for related Application No. PCT/JP2021/025729; report dated Sep. 21, 2021.

* cited by examiner

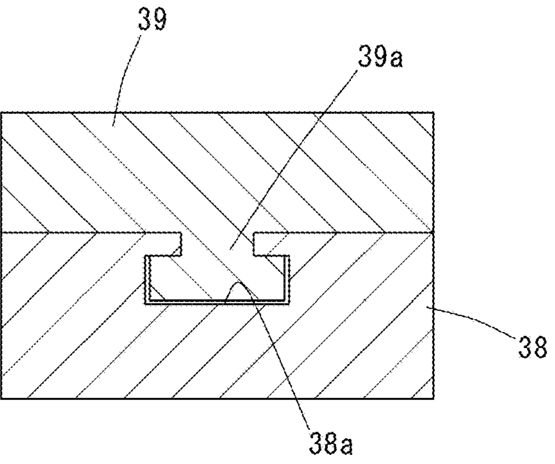
F I G. 1 1
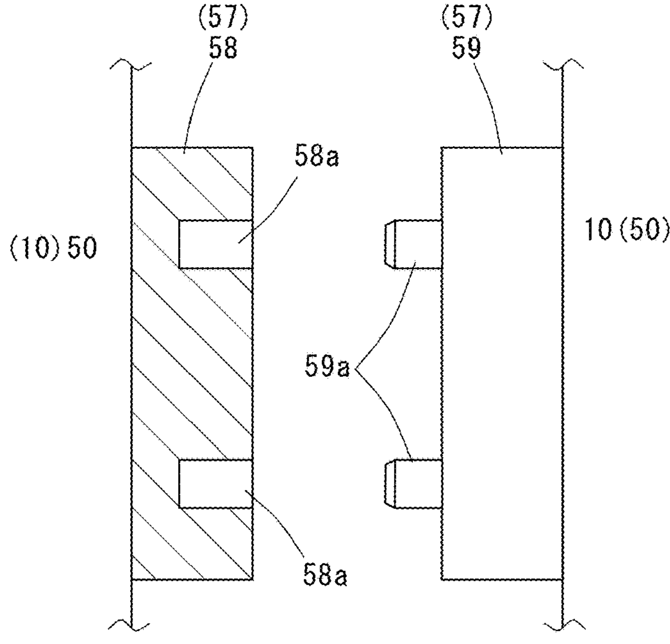
F I G. 1 2

WORKPIECE SUPPLY SYSTEM

CROSS-REFERENCE TO RELATED APPLICATION

This Application is a 35 USC $371 US National Stage filing of International Application PCT/JP2021/025729 filed on Jul. 8, 2021.

TECHNICAL FIELD

The present invention relates to a workpiece supply system that supplies a workpiece to a machine tool using a robot.

BACKGROUND ART

Japanese Unexamined Patent Application Publication No. 2016-221622 (Patent Literature 1) and International Publication No. WO 2018/92222 (Patent Literature 2) disclose conventionally known workpiece supply systems as mentioned above.

In the workpiece supply system disclosed in Patent Literature 1, a robot is fixedly disposed in the vicinity of a machine tool and this robot supplies a workpiece to the machine tool and removes a workpiece from the machine tool. Patent Literature 1 does not mention a workpiece stocker for storing unmachined workpieces and machined workpieces. However, typically, such a workpiece stocker is disposed in the vicinity of the machine tool and the robot. The robot removes a workpiece machined in the machine tool from the machine tool and stores the workpiece into the workpiece stocker and extracts an unmachined workpiece from the workpiece stocker and supplies the workpiece to the machine tool.

The workpiece supply system disclosed in Patent Literature 2 (referred to as "machine tool system" in Patent Literature 2) includes a plurality of machine tools, a plurality of workpiece stockers disposed in the vicinity of the machine tools, and a plurality of self-propelled robots capable of autonomous traveling. Each self-propelled robot includes an automated guided vehicle and a manipulator arranged on the automated guided vehicle and having three or more degrees of freedom. This self-propelled robot is configured to move to the vicinity of a target position while recognizing its own approximate position by observing a radio wave or a laser beam as position reference information and then execute precise positioning by recognizing a target or a marker attached to the target with a camera.

This self-propelled robot receives a request for work such as workpiece transport or maintenance, e.g., chip discharge, tool replacement, or oil supply, transmitted from each of the plurality of machine tools and performs the received work with respect to the machine tool as the requester.

CITATION LIST

Patent Literature

Patent Literature 1: Japanese Unexamined Patent Application Publication No. 2016-221622

Patent Literature 2: International Publication No. WO 2018/92222

SUMMARY OF INVENTION

Technical Problem

In the robot system disclosed in Patent Literature 1, one robot is fixedly arranged for one machine tool. Therefore, where there are a plurality of machine tools which are desired to be automatically supplied with a workpiece by a robot, it is necessary to arrange a robot for each machine tool. This causes a problem of excessive equipment cost.

Further, even in the case where there is only one target machine tool, the machine tool machines not only a workpiece of a simple shape but also a workpiece of a complicated shape, so that the robot hand in some cases fails to accurately grip a workpiece of a complicated shape. In such a case, it is not possible to carry out automatic workpiece supply using the robot. Accordingly, the robot may be excessive equipment in this case. Further, in the case where the robot is not used, an operator manually attaches a workpiece and removes a workpiece. In this case, the fixedly arranged robot may cause a problem that it is an obstacle that adversely affects the operator's work.

The workpiece supply system disclosed in Patent Literature 2 is capable of handling a plurality of machine tools with a single self-propelled robot. However, since the self-propelled robot is constituted by an automated guided vehicle capable of autonomous traveling, there is a problem that the equipment cost for the self-propelled robot is high. Many users desire to realize automatic workpiece supply while keeping capital investment costs down. Further, there is a demand for a workpiece supply system which is capable of handling a plurality of machine tools, instead of a fixed machine tool, in a flexible manner and with a high degree of freedom with a single robot.

The present invention has been achieved in view of the above-described circumstances and an object of the invention is to provide a workpiece supply system which realizes automatic workpiece supply at low cost and is capable of handling a plurality of machine tools with a single robot.

Solution to Problem

To solve the above-described problems, the present invention provides a workpiece supply system including:

- a robot mount carriage that includes: a carriage having a plurality of wheels and configured to be manually moved; a robot mounted on the carriage; and a controller controlling the robot; and
- a workpiece storage carriage that has a plurality of wheels and is configured to be manually moved and that includes a workpiece storage storing a workpiece, wherein:
- the robot mount carriage and the workpiece storage carriage supplies the workpiece to a predetermined target device when disposed around the target device;
- one of the robot mount carriage and workpiece storage carriage includes one of a pair of associators for associating the robot mount carriage and the workpiece storage carriage with each other; and
- the other of the robot mount carriage and workpiece storage carriage includes the other of the pair of associators.

In this workpiece supply system, the robot mount carriage and the workpiece storage carriage are moved by manual operation by an operator so that they are disposed around a predetermined target device, for example, around a machine tool. Thereafter, an association is established between the robot mount carriage and the workpiece storage carriage by the pair of associators. That is to say, a positional relationship between the robot mount carriage and the workpiece storage carriage is established or recognized.

Note that the target device to be supplied with the workpiece is not limited to a machine tool that is mentioned above. Examples of the target device include various processing devices configured to continuously process a plurality of workpieces, such as a cleaning device cleaning a workpiece and a measuring device measuring the shape and/or dimensions of a workpiece. Further, the robot can be composed of, for example, a 6-axis articulated robot. However, the robot is not limited to such a robot and may have any configuration as long as it is capable of transporting the workpiece to the target.

After the association is established between the robot mount carriage and the workpiece storage carriage, the robot is controlled by the controller so that the workpiece stored in the workpiece storage of the workpiece storage carriage is extracted and supplied to the target device by the robot.

As described above, the robot mount carriage and the workpiece storage carriage in this workpiece supply system are movable by manual operation by the operator. Therefore, automatic supply of the workpiece to each of a plurality of target devices, which are to be automatically supplied with the workpiece, can be carried out by selectively installing the robot mount carriage and the workpiece storage carriage around the target device as necessary and as appropriate; thus, the automatic supply of the workpiece is realized at low cost.

Further, when the target device around which the robot mount carriage and the workpiece storage carriage are disposed does not need the automatic supply of the workpiece anymore, the robot mount carriage and the workpiece storage carriage can be moved by manual operation by the operator so that they are withdrawn from the target device. Therefore, the operator can perform necessary work on the target device without being hindered by the robot mount carriage and the workpiece storage carriage since the robot mount carriage and the workpiece storage carriage have been withdrawn; thus, the operator can efficiently perform the work.

Further, the robot mount carriage and the workpiece storage carriage each have a relatively simple structure that does not require a sensor, a controller, and other elements for controlling the travel of the carriage. This enables the equipment costs for the robot mount carriage and the workpiece storage carriage to be reduced as compared with the conventionally-used automated guided vehicle.

In the workpiece supply system according to the above-described aspect, the pair of associators may comprise a coupler that couples the carriage of the robot mount carriage and the workpiece storage carriage with each other. A positional relationship between the robot mount carriage and the workpiece storage carriage is established by coupling them with each other with the coupler, so that the robot is able to accurately operate with respect to the workpiece storage carriage.

Alternatively, the workpiece supply system according to the above-described aspect may be configured according to the following aspect:

the pair of associators comprises a camera provided on the robot and an identifier provided on the workpiece storage carriage;

the identifier has an identification figure; and the controller is configured to: drive the camera with the robot in a predetermined image capturing pose to cause the camera to capture an image of the identifier; analyze the captured image to recognize a positional relationship between the robot mount carriage and the workpiece storage carriage; and control operation of the robot with respect to the workpiece storage carriage based on the recognized positional relationship. This aspect also enables the robot to accurately operate with respect to the workpiece storage carriage.

Alternatively, the workpiece supply system according to the above-described aspect may be configured according to the following aspect:

the pair of associators comprises an engaged body and an engaging body engageable with the engaged body;

the engaged body is provided on one of the robot and workpiece storage carriage and the engaging body is provided on the other of the robot and workpiece storage carriage; and the controller is configured to: drive the robot to recognize a positional relationship between the robot mount carriage and the workpiece storage carriage based on a posture of the robot when the engaged body and the engaging body are brought into engagement with each other; and control operation of the robot with respect to the workpiece storage carriage based on the recognized positional relationship. This aspect also enables the robot to accurately operate with respect to the workpiece storage carriage.

In the workpiece supply systems according to the above-described aspects, it is preferred that no workpiece storage for storing the workpiece is provided on a mount surface of the carriage of the robot mount carriage on which the robot is mounted. This configuration enables the carriage of the robot mount carriage to be compact, so that the convenience of handling of the robot mount carriage is improved and the equipment cost for the robot mount carriage is reduced.

Further, the workpiece supply systems according to the above-described aspects may be configured according to the following aspect:

the carriage of the robot mount carriage includes:
- three wheels arranged at predetermined intervals;
- three jacks arranged at predetermined intervals;
- a frame having the wheels and the jacks thereon; and
- a mount table arranged on the frame; and the robot is mounted on the mount table.

With this carriage, the robot mount carriage is moved by rolling of the wheels with the jacks of the carriage separated upward from a floor surface. On the other hand, pressing the jacks against the floor surface renders the carriage immovable with respect to the floor surface, whereby the robot in operation is stably supported.

Alternatively, the workpiece supply systems according to the above-described aspects may be configured according to the following aspect:

the carriage of the robot mount carriage includes:
- three wheels arranged at predetermined intervals;
- a wheel frame having the wheels thereon;
- three jacks arranged at predetermined intervals;
- a jack frame having the jacks thereon; and
- a mount table for mounting the robot thereon;

one of the wheel frame and jack frame is arranged on the other of the wheel frame and jack frame via an elevating mechanism;

the mount table is arranged on the one of the wheel frame and jack frame;

when the wheel frame is moved downward by the elevating mechanism, the wheels are brought into contact with a floor surface and the jacks are separated upward from the floor surface; and when the wheel frame is moved upward by the elevating mechanism, the wheels are separated upward from the floor surface and the jacks are brought into contact with the floor surface.

With this carriage, downward movement of the wheel frame by the elevating mechanism brings the wheels into contact with the floor surface and separates the jacks upward from the floor surface. In this state, the robot mount carriage is moved by rolling of the wheels. On the other hand, upward movement of the wheel frame by the elevating mechanism separates the wheels upward from the floor surface and presses the jacks against the floor surface. This renders the carriage immovable with respect to the floor surface, whereby the robot in operation is stably supported.

Note that it is preferred that the wheels and the jacks are arranged so as to mutually form an inverted triangle in plan view. Further, it is preferred that the robot is mounted on the carriage so as to be located inside a triangle connecting the wheels and a triangle connecting the jacks in plan view. With these configurations, the robot is stably supported both when the robot mount carriage is moved by rolling of the wheels and when the jacks are pressed against the floor surface and the carriage is thereby rendered immovable with respect to the floor surface.

Advantageous Effects of Invention

In the workpiece supply system according to the present invention, as described above, the robot mount carriage and the workpiece storage carriage are movable by manual operation by the operator. Therefore, automatic supply of the workpiece to each of a plurality of target devices, which are to be automatically supplied with the workpiece, can be carried out by selectively installing the robot mount carriage and the workpiece storage carriage around the target device as necessary and as appropriate; thus, the automatic supply of the workpiece is realized at low cost.

Further, when the target device around which the robot mount carriage and the workpiece storage carriage are disposed does not need the automatic supply of the workpiece anymore, the robot mount carriage and the workpiece storage carriage can be moved by manual operation by the operator so that they are withdrawn from the target device. Therefore, the operator can perform necessary work on the target device without being hindered by the robot mount carriage and the workpiece storage carriage since the robot mount carriage and the workpiece storage carriage have been withdrawn; thus, the operator can efficiently perform the work.

Further, the robot mount carriage and the workpiece storage carriage each have a relatively simple structure that does not require a sensor, a controller, and other elements for controlling the travel of the carriage. This enables the equipment costs for the robot mount carriage and the workpiece storage carriage to be reduced as compared with the conventionally-used automated guided vehicle.

BRIEF DESCRIPTION OF DRAWINGS

FIG. 11 is an illustrative diagram illustrating an engagement between an upper wedge and a lower wedge in the embodiment; and FIG. 12 is an illustrative diagram illustrating an associator in another embodiment of the present invention.

DESCRIPTION OF EMBODIMENTS

Hereinafter, a specific embodiment of the present invention will be described with reference to the drawings.

Figure 1:
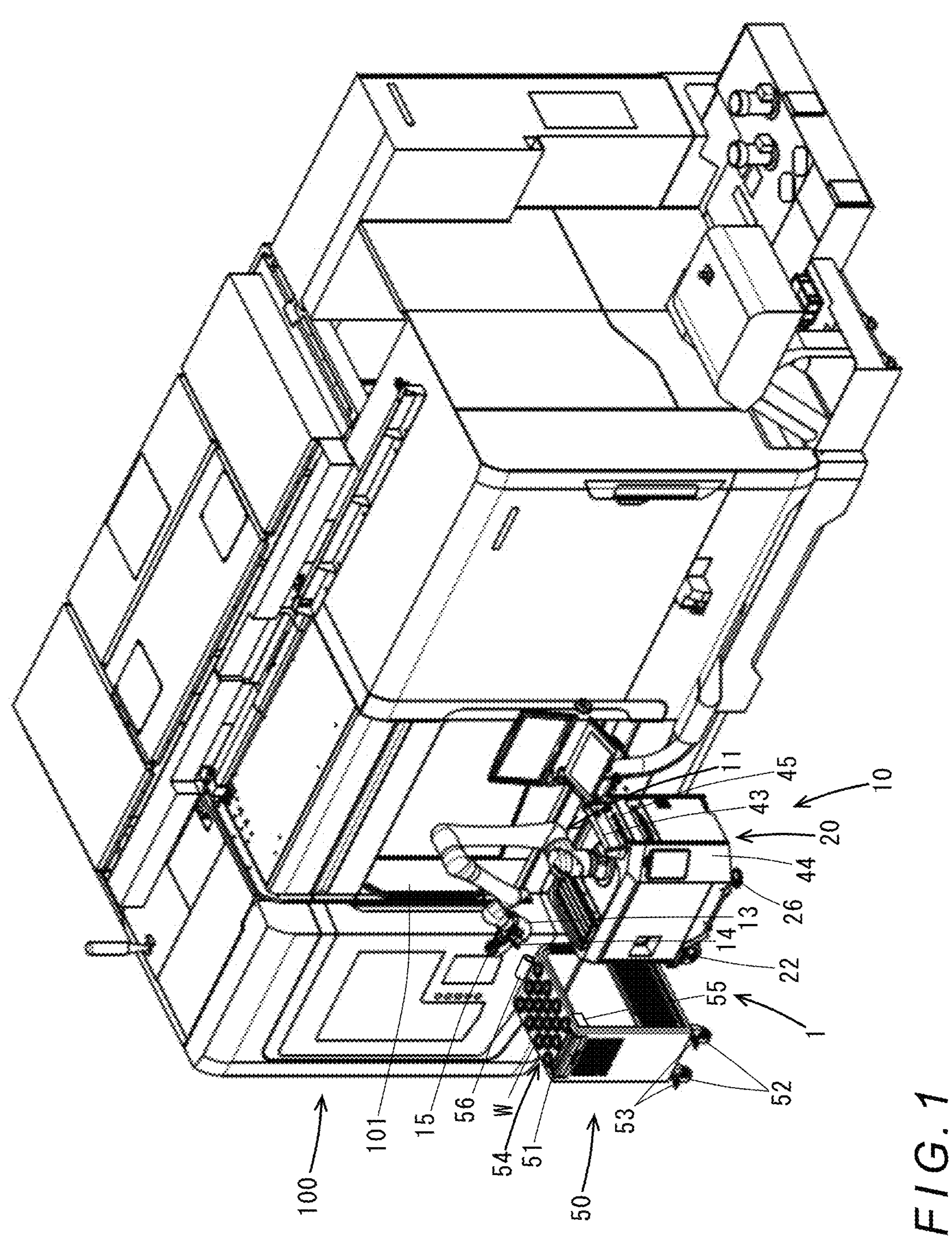
FIG. 1 is a perspective view illustrating a workpiece supply system according to an embodiment of the present invention and a machine tool provided with the workpiece supply system.
Figure 2:
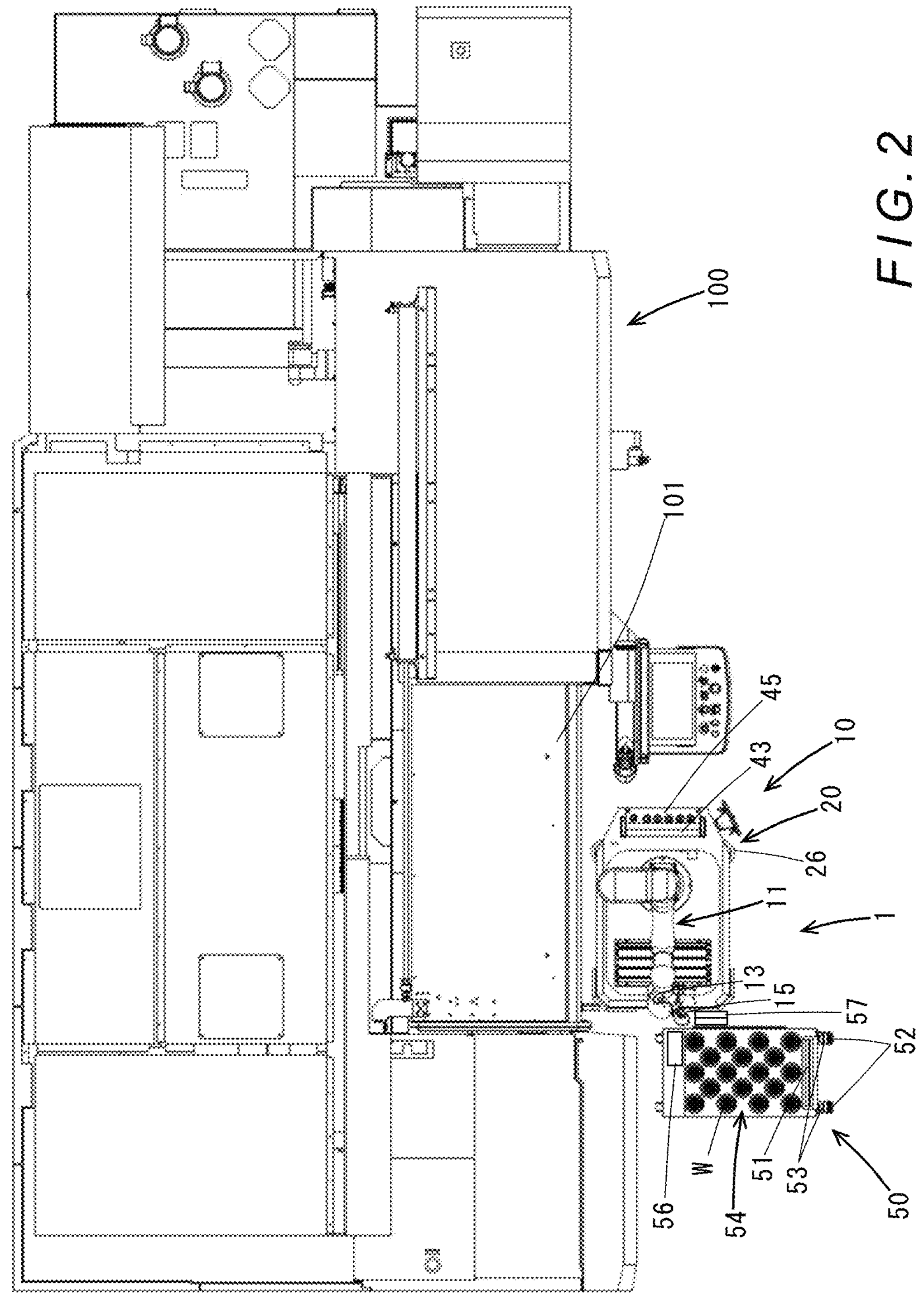
FIG. 2 is a plan view of the workpiece supply system and machine tool illustrated in FIG. 1.

As illustrated in FIGS. 1 and 2, a workpiece supply system 1 according to this embodiment is installed in the vicinity of a door 101 of a machine tool 100 to automatically supply a workpiece W to the machine tool 100. Note that the machine tool 100 in this embodiment is composed of a combined NC machine tool capable of turning and milling. However, the workpiece supply system 1 according to this embodiment is not limited to being applied to such a machine tool and may be applied to other devices including conventionally known differently configured machine tools as well as various processing devices configured to continuously process a plurality of workpieces, such as a cleaning device cleaning a workpiece and a measuring device measuring the shape and/or dimensions of a workpiece.

The machine tool 100 is composed of an NC machine tool that is numerically controlled by a numerical controller. The machine tool 100 has in a machining area thereof a spindle holing a chuck as wells as a tool rest and a tool spindle holding tools. Under control by the numerical controller, a workpiece W held by the chuck is machined by a tool held by the tool rest or the tool spindle. The door 101 is also operationally controlled by the numerical controller to open and close the machining area.

The workpiece supply system 1 according to this embodiment consists of a robot mount carriage 10 and a workpiece storage carriage 50.

As illustrated in FIGS. 1 and 2, the workpiece storage carriage 50 is composed of the so-called hand-push carriage that has a handle 51. The workpiece storage carriage 50 has on the top thereof a workpiece storage 54 for storing a plurality of workpieces W. Note that the workpiece storage 54 stores unmachined workpieces W to be machined in the NC machine tool 100 and machined workpieces W machined in the NC machine tool 100.

The workpiece storage carriage 50 has on the front side in the hand-push direction thereof two fixed wheels (not illustrated) with a braking mechanism (not illustrated) and has on the rear side in the hand-push direction thereof two free wheels 52 with a braking mechanism 53. An operator can move the workpiece storage carriage 50 in the hand-push direction (forward) by holding the handle 51 and pushing it forward. Further, the operator can render the workpiece storage carriage 50 stationary (immovable) at a position by activating the braking mechanism (not illustrated) and the braking mechanism 53 with the workpiece storage carriage 50 stopped at the position.

Figure 10:
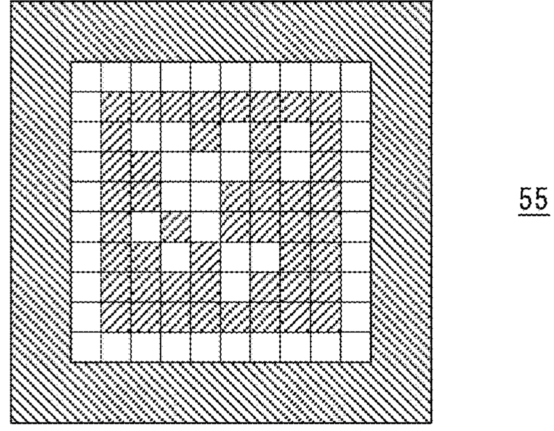
FIG. 10 is an illustrative diagram illustrating an identifier (identification figure) in the embodiment.

The workpiece storage carriage 50 further has an identifier 55 on a side surface thereof located on the right side in the hand-push direction. The identifier 55 has an identification figure, as illustrated in FIG. 10, drawn thereon. By way of example, the identification figure has a matrix structure having a plurality of square pixels arranged two-dimensionally and each pixel is displayed in white or black. In FIG. 10, the pixels displayed in black are hatched. The identifier 55 constitutes a pair of associators together with a camera 15 that is described in detail later.

Although not particularly illustrated in FIGS. 1 and 2, an identifier identical to the identifier 55 is provided in the machining area of the machine tool 100.

Figure 3:
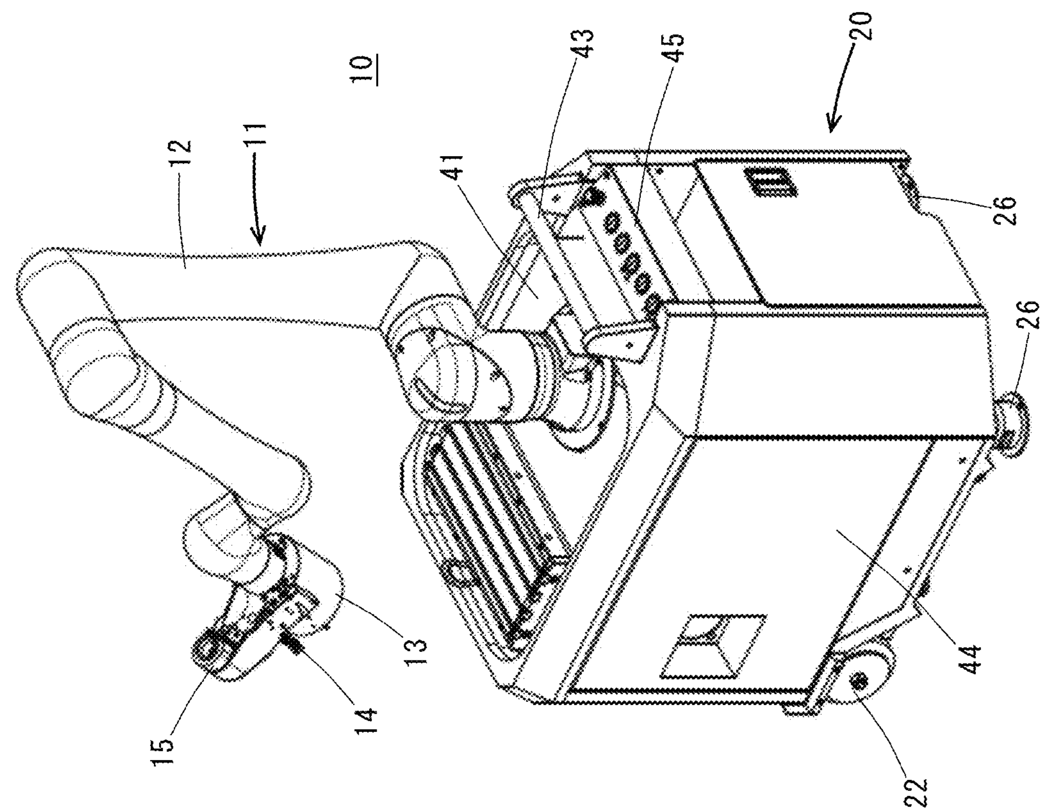
FIG. 3 is a perspective view illustrating a robot mount carriage in the embodiment.
Figure 4:
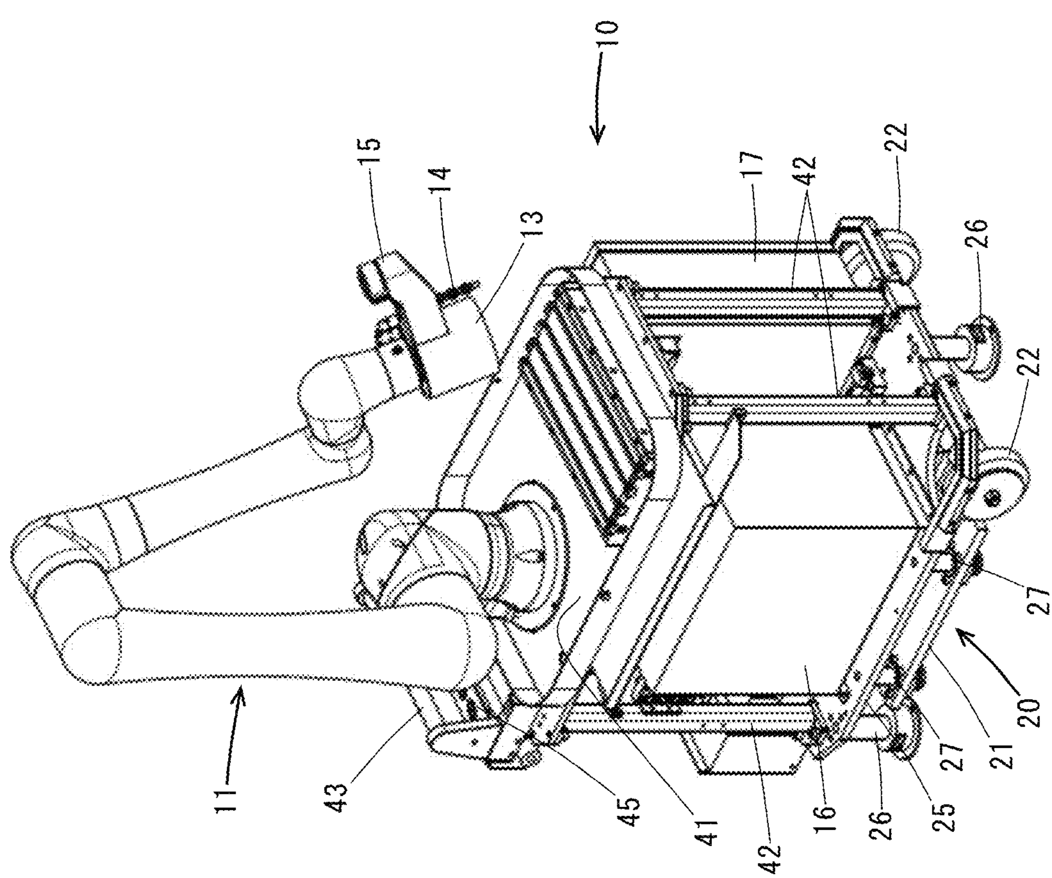
FIG. 4 is a perspective view illustrating the robot mount carriage in the embodiment with a cover removed.

As illustrated in FIGS. 3 and 4, the robot mount carriage 10 includes a manually-moved movable carriage 20, a robot 11 mounted on the movable carriage 20, a controller 16 controlling the robot 11, and a distribution board 17 supplying electric power to the controller 16.

The robot 11 consists of a manipulator 12 constituted by a plurality of arms, a hand 13 as an end effector provided on the distal end of the manipulator 12, and a camera 15 attached to the hand 13. The robot 11 performs workpiece transfer under control by the controller 16. Note that the robot 11 in this embodiment is composed of a 6-axis articulated robot. However, the robot 11 is not limited to such a robot and may have any configuration as long as it is capable of transporting a workpiece W to the machine tool 100.

Figure 9:
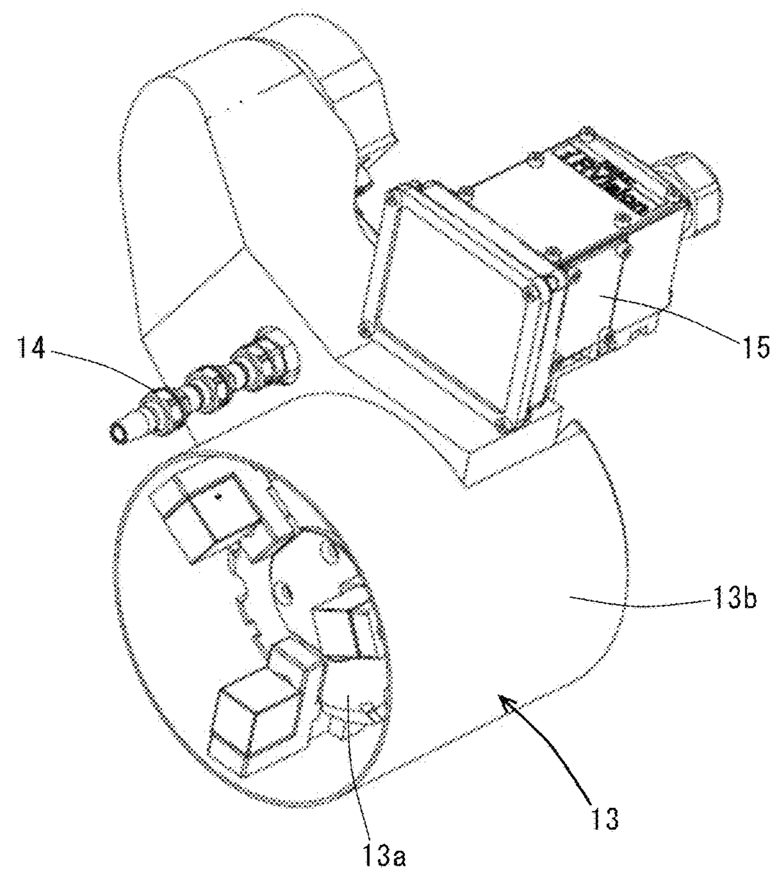
FIG. 9 is a perspective view illustrating a robot hand in the embodiment.

As illustrated in FIG. 9, the hand 13 is constituted by a typical three-jaw chuck 13*a* and a cover 13*b* arranged to surround the chuck 13*a*. Further, an air nozzle 14 discharging compressed air is provided in the vicinity of the hand 13.

The movable carriage 20 includes a carriage unit, a mount table 41, a handle 43, an operation panel 45, and a covering body 44. The carriage unit includes a wheel frame 21 having a plurality of wheels (in this example, three wheels) 22, 23, a jack frame 25 having a plurality of jacks (in this example, three jacks) 26, and an elevating mechanism 30. The mount table 41 is arranged on the carriage unit.

Figure 5:
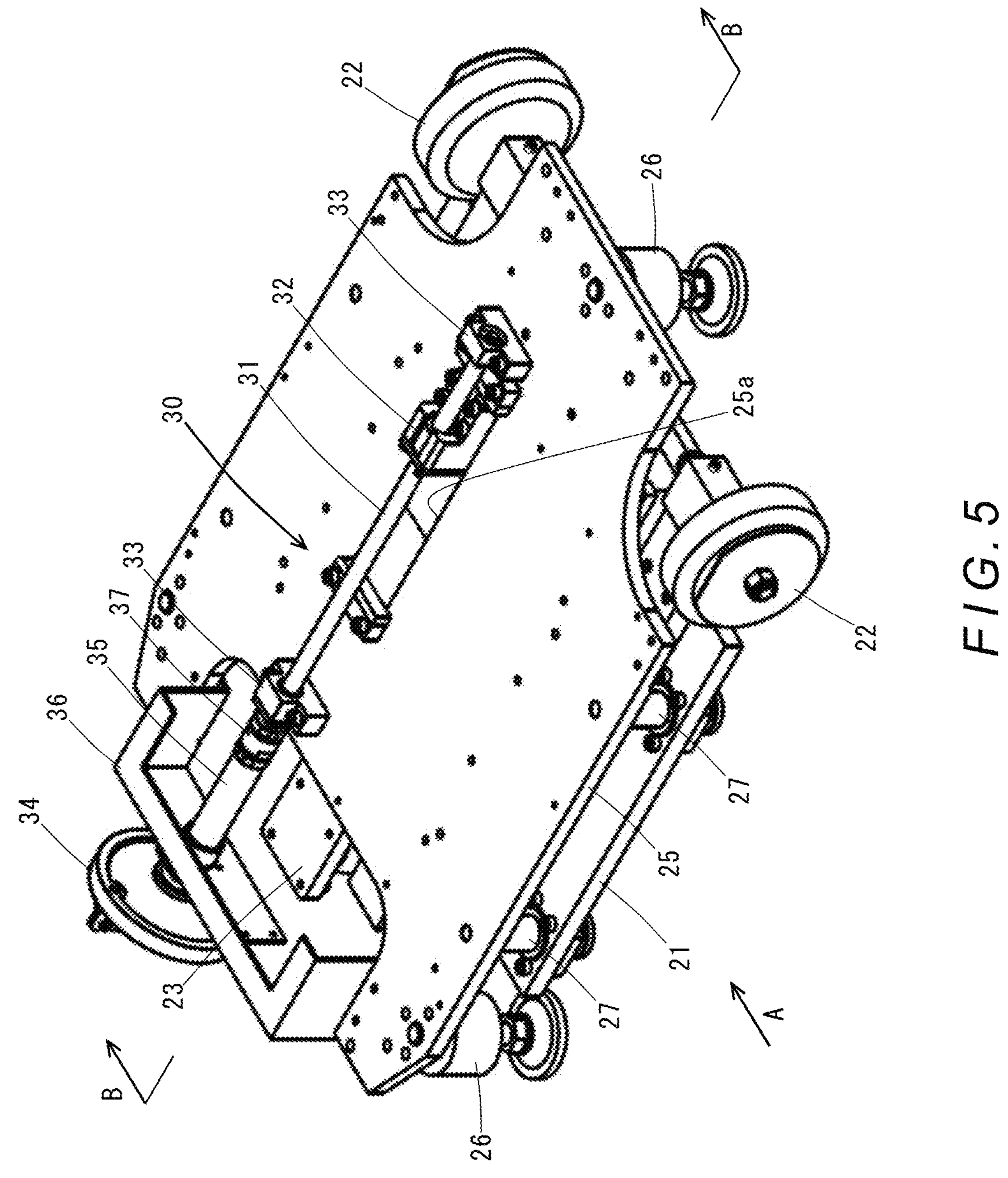
FIG. 5 is a perspective view illustrating a carriage as a component of the robot mount carriage in the embodiment.
Figure 6:
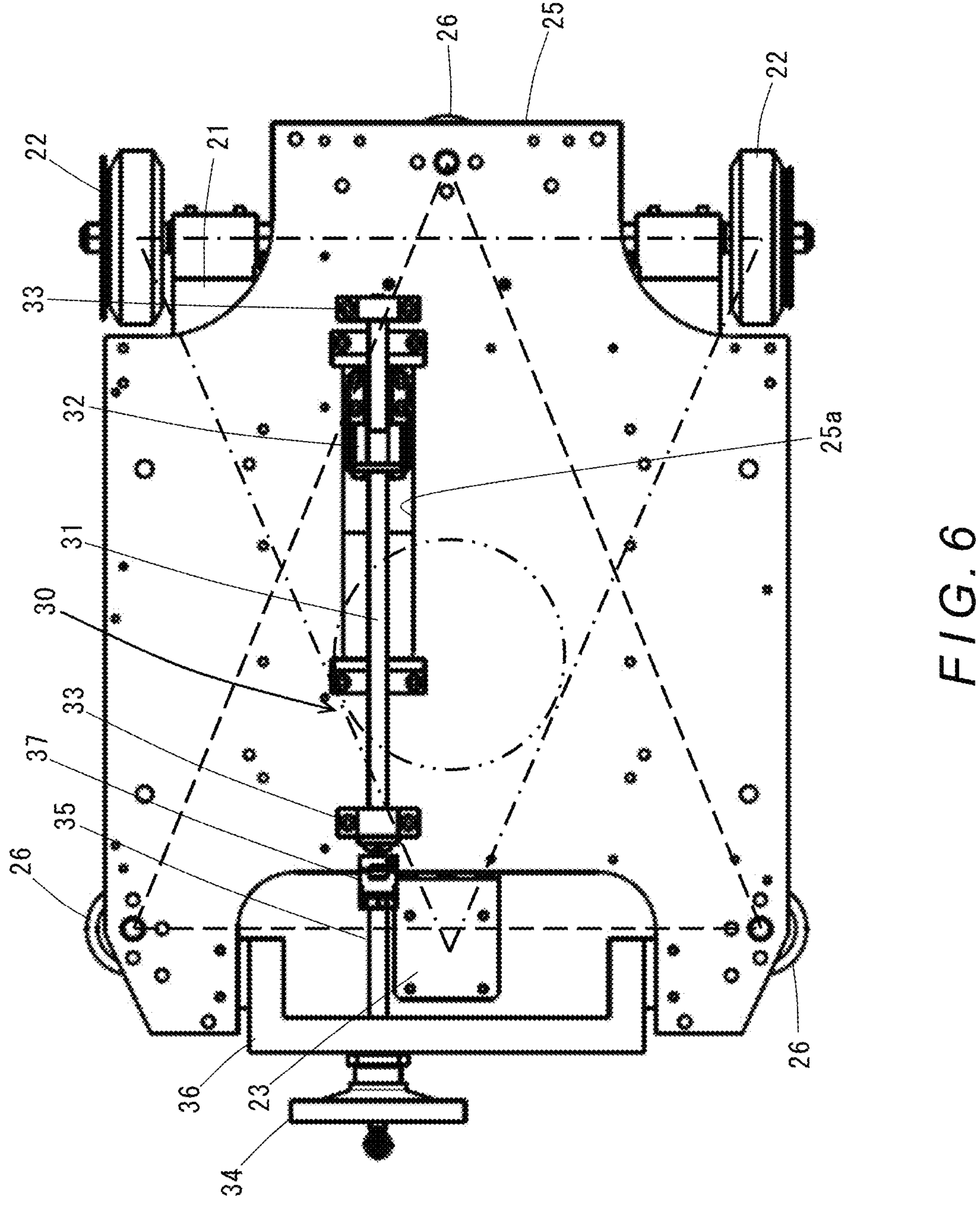
FIG. 6 is a plan view illustrating the carriage of the robot mount carriage in the embodiment.

As illustrated in FIGS. 5 and 6, the jack frame 25 is composed of a plate-shaped member and the jacks 26 are fixed to a lower surface of the jack frame 25 to extend downward from the jack frame 25. The three jacks 26 are arranged such that the lines connecting the jacks 26 form an isosceles triangle as indicated by the broken lines in FIG. 6. Each jack 26 has a known structure including a screw shaft and a nut screwed on the screw shaft. By adjusting the screwing position of the screw shaft and nut, the position of a lower surface of the jack 26 in the vertical direction is adjusted.

The wheel frame 21 is also composed of a plate-shaped member. The wheel frame 21 is arranged under the jack frame 25. The wheel frame 21 has a pair of fixed wheels 22, 22 and one free wheel 23 fixed thereto. The wheels 22, 22, 23 are arranged such that the lines connecting the wheels 22, 22, 23 form an isosceles triangle as indicated by the dashed and dotted lines in FIG. 6. Furthermore, the wheels 22, 22, 23 are arranged so as to form an inverted triangle with respect to the three jacks 26 in plan view.

Figure 7:
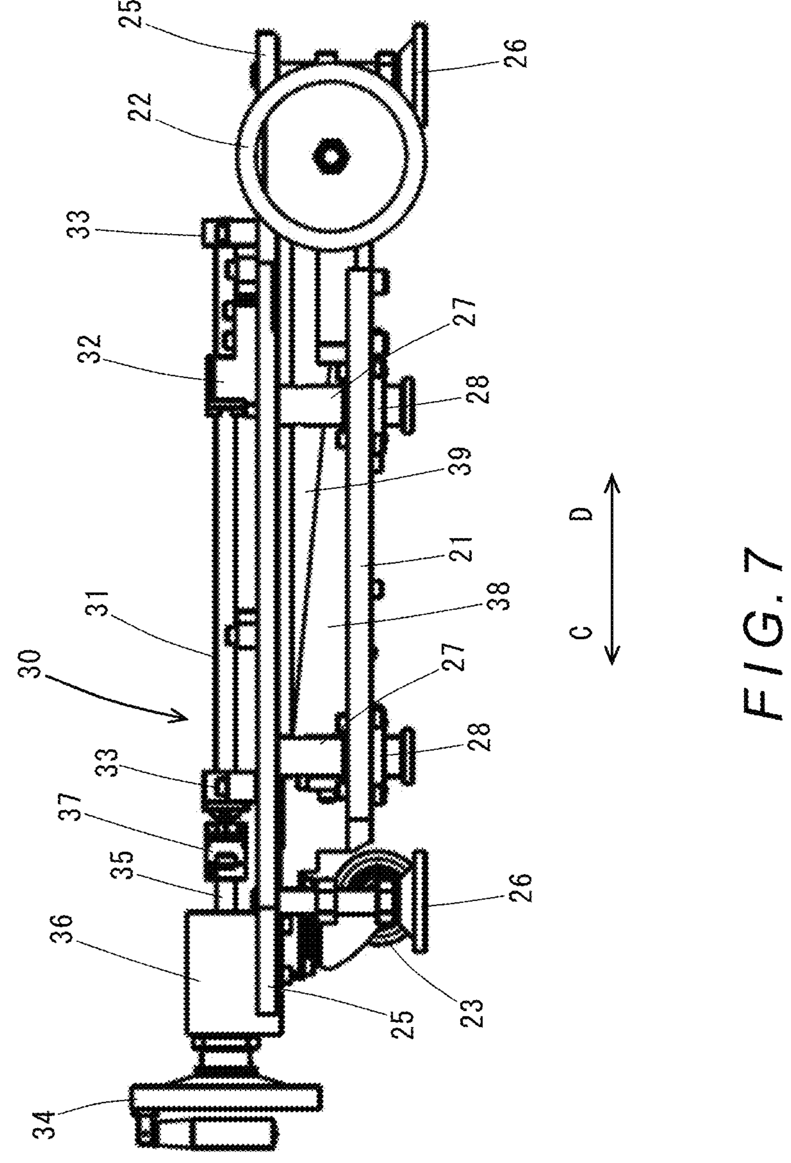
FIG. 7 is a front view as viewed in the direction of arrow A in FIG. 5.

As illustrated in FIG. 7, four guide bars 27 are fixed to the lower surface of the jack frame 25 to extend downward from the jack frame 25. Each guide bar 27 is inserted through a bearing 28 arranged to penetrate the wheel frame 21. The wheel frame 21 and the jack frame 25 are guided by the guide bars 27 to approach and separate from each other.

As illustrated in FIG. 4, the mount table 41 is supported by support pillars 42 and arranged on the jack frame 25. The support pillars 42 are erected on the jack frame 25 and the mount table 41 is fixed to the upper ends of the support pillars 42. The robot 11 is fixed on the mount table 41. The controller 16 and the distribution board 17 are arranged on the jack frame 25. The covering body 44 is attached to outer peripheral surfaces of the mount table 41 and jack frame 25 to surround the space between the mount table 41 and the jack frame 25 so as to separate the space from the outside. In this embodiment, no workpiece storage for storing workpieces W is provided on the top of the mount table 41.

The handle 43 is arranged on the free wheel 23 side of the mount table 41. The operation panel 45 is arranged below the handle 43. The operator can move the movable carriage 20 in the hand-push direction (forward) by holding the handle 43 and pushing it forward. The operation panel 45 is used to input operation signals into the controller 16. For example, signals such as a start signal for causing the robot 11 to automatically operate, a manual operation signal, and an emergency stop signal are input into the controller 16 by predetermined operation keys being pressed.

As indicated by the dashed and double-dotted line in FIG. 6, the robot 11 is arranged on the mount table 41 so as to be located inside the triangle connecting the wheels 22, 22, 23 and the triangle connecting the jacks 26 in plan view. Note that, although three support pillars 42 are shown in FIG. 4, four support pillars 42 are provided in this embodiment.

The elevating mechanism 30 includes a drive screw 31 arranged on the jack frame 25, a nut 32 screwed on the drive screw 31, bearings 33, 33 supporting the drive screw 31 in such a manner as to allow the drive screw 31 to rotate, a lower wedge 38 arranged on the wheel frame 21, and an upper wedge 39 engaged with the lower wedge 38.

The drive screw 31 is disposed perpendicularly to the straight line connecting the pair of fixed wheels 22, 22. The two ends of the drive screw 31 are rotatably supported by the bearings 33, 33 that are fixed on the jack frame 25. One end of the drive screw 31 is coaxially connected to one end of a transmission shaft 35 via a coupling 37. The transmission shaft 35 is rotatably supported by a bracket 36 fixed to the jack frame 25. A wheel 34 is provided on the other end of the transmission shaft 35. Thus, when the wheel 34 is turned, the rotational power thereof is transmitted to the drive screw 31 via the transmission shaft 35. Thereby, the drive screw 31 is rotated and the nut 32 screwed on the drive screw 31 is moved in the axial direction of the drive screw 31.

Further, the jack frame 25 has a rectangular elongated through hole 25*a* formed therein that penetrates the jack frame 25 vertically along the drive screw 31. The nut 32 is inserted through the through hole 25*a*. The nut 32 is connected to the upper wedge 39 by a connecting plate 40 fixed to a lower surface of the nut 32 (see FIG. 8).

The lower wedge 38 has an upper surface as an inclined surface with an acute angle (for example, 5° to 15°). The upper wedge 39 has a lower surface as an inclined surface with an acute angle (for example, 5° to 15°). The lower wedge 38 and the upper wedge 39 are engaged with each other such that the inclined surfaces thereof are in contact with each other. This engagement is such that the lower wedge 38 and the upper wedge 39 are movable relative to each other along the inclined surfaces thereof. For example, the lower wedge 38 and the upper wedge 39 can be, but not limited to, engaged with each other as shown in FIG. 11.

FIG. 11 shows cross sections of the lower wedge 38 and upper wedge 39. In this example, the lower wedge 38 has a dovetail groove 38*a* formed thereon. The dovetail groove 38*a* is formed along the inclined surface of the lower wedge 38 to be open in the upper surface of the lower edge 38. The upper wedge 39 has a dovetail (tenon) 39*a* formed thereon. The dovetail 39*a* is formed along the inclined surface of the upper edge 39 on the lower surface (inclined surface) of the upper wedge 39. The dovetail 39*a* is fitted in the dovetail groove 38*a*, whereby the lower wedge 38 and the upper wedge 39 are engaged with each other. The thus-engaged lower wedge 38 and upper wedge 39 are movable relative to each other along the inclined surfaces thereof without being separated from each other.

Figure 8:
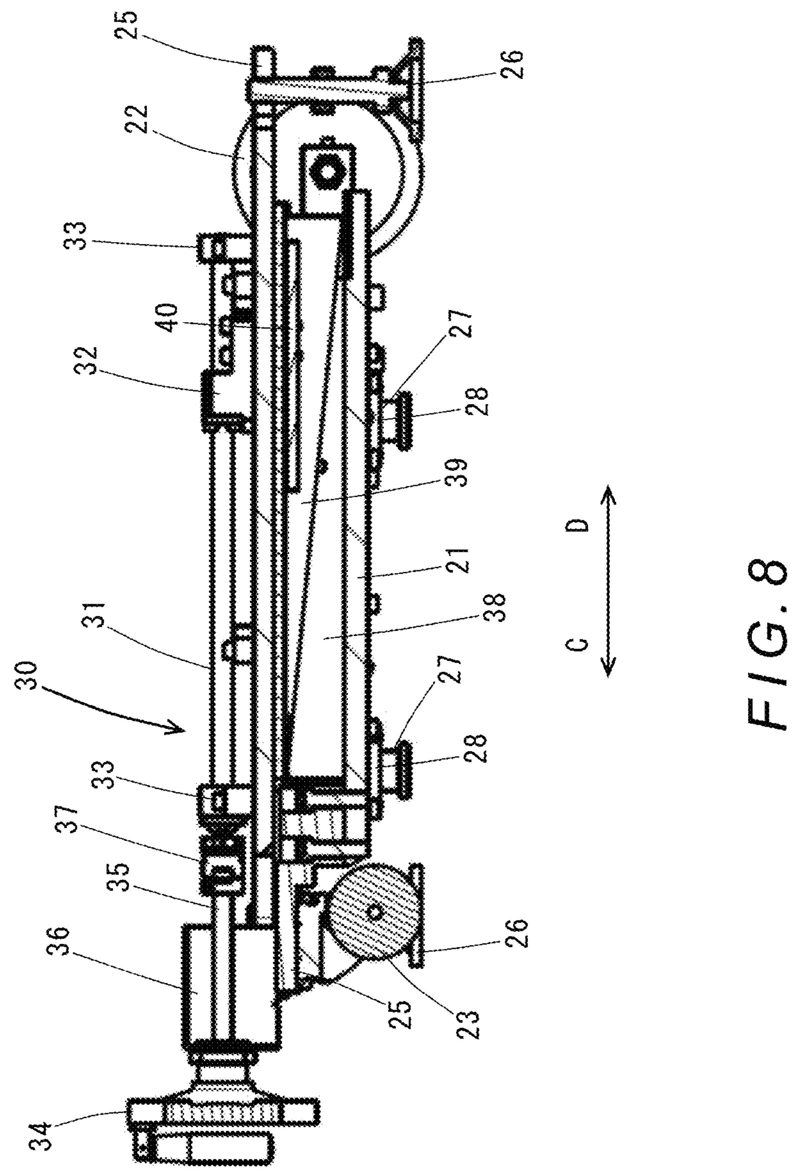
FIG. 8 is a sectional view taken along line B-B in FIG. 5.

As illustrated in FIGS. 7 and 8, the lower wedge 38 is fixed on the wheel frame 21 with a lower surface of the lower wedge 38 in contact with an upper surface of the wheel frame 21. The upper wedge 39 is connected to the nut 32 via the connecting plate 40. The jack frame 25 is mounted on the connecting plate 40.

Thus, when the drive screw 31 is rotated by the wheel 34 being turned, the nut 32 screwed on the drive screw 31 moves in the axial direction of the drive screw 31. Further, the connecting plate 40 connected to the nut 32 and the upper wedge 39 connected to the connecting plate 40 move in the axial direction of the drive screw 31 together with the nut 32.

For example, when the nut 32, the connecting plate 40, and the upper wedge 39 move in the direction of arrow C in FIG. 8, the upper wedge 39 and the connecting plate 40 move upward in accordance with the engagement between the upper wedge 39 and the lower wedge 38. Along with this movement, the jack frame 25 mounted on the connecting plate 40 and the jacks 26 fixed to the jack frame 25 move upward, so that the wheels 22, 22, 23 fixed to the wheel frame 21 are grounded.

When the nut 32, the connecting plate 40, and the upper wedge 39 move in the direction of arrow D, the upper wedge 39 and the connecting plate 40 move downward in accordance with the engagement between the upper wedge 39 and the lower wedge 38. Along with this movement, the jack frame 25 mounted on the connecting plate 40 and the jacks 26 fixed to the jack frame 25 move downward, so that the jacks 26 are grounded. On the other hand, since the weights of the robot 11 and other elements act on the jack frame 25, the wheel frame 21 and the wheels 22, 22, 23 fixed to the wheel frame 21 reactively move upward.

Note that the wheel frame 21 and the jack frame 25 approach and separate from each other while being guided by the guide bars 27 as described above. Therefore, the wheel frame 21 and the jack frame 25 stably move upward and downward by virtue of the guide bars 27.

With the robot mount carriage 10 and the workpiece storage carriage 50 positioned at the positions shown in FIGS. 1 and 2, the controller 16 controls operation of the robot 11 in accordance with control signals input from the operation panel 45 provided on the robot mount carriage 10. For example, when a manual operation signal is input from the operation panel 45, the controller 16 causes the robot to operate in accordance with the manual operation signal. When an automatic operation start signal is input from the operation panel 45, the controller 16 causes the robot 11 to operate in accordance with a predetermined program.

In the automatic operation, for example, the controller 16 causes the robot 11 to perform the following operations.

<Machine Tool Identifier Image Capturing Operation>

In cooperation with the machine tool 100, the robot 11 captures an image of the identifier (not illustrated) in the machining area of the machine tool 100 with the camera 15. This operation consists of:

moving the hand 13 into the machining area of the machine tool 100, positioning the camera 15 opposite the identifier (not illustrated), and then causing the camera 15 to capture an image of the identifier (not illustrated); and thereafter, moving the hand 13 out of the machining area of the machine tool 100.

<Workpiece Storage Carriage Identifier Image Capturing Operation>

The robot 11 positions the camera 15 opposite the identifier 55 on the workpiece storage carriage 50 and then causes the camera 15 to capture an image of the identifier 55.

<Machined Workpiece Removing Operation>

In cooperation with the machine tool 100, the robot 11 removes a workpiece W machined in the machine tool 100. This operation consists of:

moving the hand 13 into the machining area of the machine tool 100;

thereafter, causing the hand 13 to grip a machined workpiece W held in the machine tool 100; and moving the hand 13 gripping the workpiece W out of the machining area of the machine tool 100.

<Machined Workpiece Storing Operation>

The robot 11 stores the workpiece W removed from the machine tool 100 into the workpiece storage carriage 50. This operation consists of:

moving the hand 13 gripping the workpiece W to a position above an empty area of the workpiece storage 54 of the workpiece storage carriage 50; and moving the hand 13 gripping the workpiece W downward to place the workpiece W onto the empty area of the workpiece storage 54.

<Unmachined Workpiece Extracting Operation>

The robot 11 extracts an unmachined workpiece W from the workpiece storage carriage 50. This operation consists of:

moving the hand 13 gripping no workpiece to a position above an unmachined workpiece W stored in the workpiece storage 54 of the workpiece storage carriage 50; and moving the hand 13 downward, causing the hand 13 to grip the unmachined workpiece W, and then extracting the unmachined workpiece W from the workpiece storage 54.

<Unmachined Workpiece Attaching Operation>

In cooperation with the machine tool 100, the robot 11 attaches the unmachined workpiece W to the machine tool 100. This operation consists of:

moving the hand 13 gripping the unmachined workpiece W into the machining area of the machine tool 100;

thereafter, attaching the unmachined workpiece W gripped by the hand 13 to machine tool 100; and thereafter, moving the hand 13 out of the machining area of the machine tool 100.

Note that the robot 11 illustrated in FIGS. 1 and 2 is in a standby pose. When performing the removing operation, the extracting operation, the storing operation, and the attaching operation, the robot 11 may start the operations in the standby pose and may finish the operations in the standby pose.

The operating poses of the robot 11 are set as control reference poses by the so-called teaching operation in advance before the automatic operation is repeatedly carried out, and information on the poses is stored in the controller 16. Also in the teaching operation, the operation of causing the camera 15 to capture an image of the identifier (not illustrated) on the machine tool 100 is executed, and the captured image of the identifier (not illustrated) on the machine tool 100 is stored as a reference image in the controller 16. Further, the operation of causing the camera 15 to capture an image of the identifier 55 on the workpiece storage carriage 50 is also executed, and the captured image of the identifier 55 is stored as a reference image in the controller 16.

In the automatic operation, the controller 16 executes the following processing. The controller 16 executes the operation of causing the camera 15 to capture an image of the identifier (not illustrated) on the machine tool 100, and analyzes the currently-captured image of the identifier (not illustrated), i.e., the currently-captured image of the identification figure, and the image of the identifier (not illustrated) captured in the teaching operation, i.e., the image of the identification figure captured in the teaching operation. Particularly, the controller 16 analyzes, for example, the tilt, scale, and rotation of the identification figure. Thereafter, the controller 16 calculates an error amount of the positional relationship between the robot 11 and the machine tool 100 in the automatic operation (at present) with respect to the positional relationship between the robot 11 and the machine tool 100 in the teaching operation.

Further, the controller 16 also executes the following processing. The controller 16 executes the operation of causing the camera 15 to capture an image of the identifier 55 on the workpiece storage carriage 50, and analyzes the currently-captured image of the current identifier 55 and the image of the identifier 55 captured in the teaching operation in a similar manner as described above. Thereafter, the controller 16 calculates an error amount of the positional relationship between the robot 11 and the workpiece storage carriage 50 in the automatic operation (at present) with respect to the positional relationship between the robot 11 and the workpiece storage carriage 50 in the teaching operation.

When executing the machined workpiece removing operation and the unmachined workpiece attaching operation, the controller 16 compensates the operating poses of the robot 11 based on the calculated error amount of the positional relationship between the robot 11 and the machine tool 100 at present. When executing the machined workpiece storing operation and the unmachined workpiece extracting operation, the controller 16 compensates the operating poses of the robot 11 based on the calculated error amount of the positional relationship between the robot 11 and the workpiece storage carriage 50 at present.

In the workpiece supply system 1 according to this embodiment having the above-described configuration, workpieces W stored in the workpiece storage carriage 50 are automatically supplied to the machine tool 100 by the robot 11 in the manner described below. Note that the jack frame 25 of the robot mount carriage 10 is moved in the direction of arrow C in FIG. 8 in advance by the wheel 34 being operated to ground the wheels 22, 23, so that the robot mount carriage 10 is movable by hand-push by the operator. Further, the braking mechanism (not illustrated) for the fixed wheels (not illustrated) and the braking mechanism 53 for the free wheels 52 of the workpiece storage carriage 50 are released, so that the workpiece storage carriage 50 is movable by hand-push by the operator. Further, it is assumed that the workpiece storage 54 of the workpiece storage carriage 50 appropriately stores unmachined workpieces W.

First, the robot mount carriage 10 and the workpiece storage carriage 50 are moved by hand-push by the operator so that they are positioned at preset positions with respect to the machine tool 100. Thereafter, the operator operates the braking mechanism (not illustrated) for the fixed wheels (not illustrated) and the braking mechanism 53 for the free wheels 52 of the workpiece storage carriage 50 to lock the fixed wheels (not illustrated) and the free wheels 52. Thereby, the workpiece storage carriage 50 is rendered stationary at the installation position.

Further, the operator operates the wheel 34 of the robot mount carriage 10 to move the jack frame 25 in the direction of arrow D in FIG. 8, so that the jacks 26 are grounded and the wheels 22, 22, 23 are moved upward. Thereby, the robot mount carriage 10 is rendered stationary at the installation position.

Subsequently, the operator inputs the automatic operation start signal into the controller 16 by pressing an operation key provided on the operation panel 45 of the robot mount carriage 10. Once the automatic operation start signal is input, in cooperation with the machine tool 100, the controller 16 first drives the robot 11 with the door 101 of the machine tool 100 opened to execute the operation of causing the camera 15 to capture an image of the identifier (not illustrated) on the machine tool 100. Based on the captured image, the controller 16 calculates an error amount of the positional relationship between the robot 11 and the machine tool 100 at present with respect to the positional relationship between the robot 11 and the machine tool 100 in the teaching operation. Based on the calculated error amount, the positional relationship between the robot mount carriage 10 and the machine tool 100 is recognized. Thus, an association is established between the robot mount carriage 10 and the machine tool 100 by the pair of associators that consists of the camera 15 and the identifier (not illustrated).

Further, the controller 16 drives the robot 11 to execute the operation of causing the camera 15 to capture an image of the identifier 55 on the workpiece storage carriage 50. Based on the captured image, the controller 16 calculates an error amount of the positional relationship between the robot 11 and the workpiece storage carriage 50 at present with respect to the positional relationship between the robot 11 and the workpiece storage carriage 50 in the teaching operation. Based on the calculated error amount, the positional relationship between the robot mount carriage 10 and the workpiece storage carriage 50 is recognized. Thus, an association is established between the robot mount carriage 10 and the workpiece storage carriage 50 by the pair of associators that consists of the camera 15 and the identifier 55.

Subsequently, the controller 16 causes the robot 11 to sequentially perform the "machined workpiece removing operation", the "machined workpiece storing operation", the "unmachined workpiece extracting operation", and the "unmachined workpiece attaching operation" while compensating the poses of the robot 11 based on the calculated error amounts. Thereafter, the controller 16 transmits a workpiece removal and attachment completion signal to the machine tool 100.

Upon receiving the workpiece removal and attachment completion signal from the controller 16, the machine tool 100 closes the door 101 and carries out machining of the attached workpiece W. Upon completing the machining of the workpiece W, the machine tool 100 opens the door 101 and transmits a machining completion signal to the controller 16. Thereafter, the controller 16 repeatedly causes the robot 11 to perform the above-described workpiece removal and attachment, while cooperating with the machine tool 100. Thus, the set number of workpieces W are supplied to the machine tool 100.

In the workpiece supply system 1 according to this embodiment having the above-described configuration, the robot mount carriage 10 and the workpiece storage carriage

50 are movable by manual operation by the operator. Therefore, automatic supply of a workpiece W to each of a plurality of target devices, which are to be automatically supplied with the workpiece W, e.g., the machine tool 100, can be carried out by selectively installing the robot mount carriage 10 and the workpiece storage carriage 50 around the target device as necessary and as appropriate; thus, the automatic supply of the workpiece W is realized at low cost.

Further, when the machine tool 100 as the automatic supply target does not need the automatic supply of the workpiece W by the robot mount carriage 10 and the workpiece storage carriage 50 anymore, the robot mount carriage 10 and the workpiece storage carriage 50 can be moved by manual operation by the operator so that they are withdrawn from the target machine tool 100. Thereafter, the operator can perform necessary work on the machine tool 100 without being hindered by the robot mount carriage 10 and the workpiece storage carriage 50 since the robot mount carriage 10 and the workpiece storage carriage 50 have been withdrawn; thus, the operator can efficiently perform the work.

Further, the robot mount carriage 10 and the workpiece storage carriage 50 each have a relatively simple structure that does not require a sensor, a controller, and other elements for controlling the travel of the carriage. This enables the equipment costs for the robot mount carriage 10 and the workpiece storage carriage 50 to be reduced as compared with the conventionally-used automated guided vehicle.

Further, no workpiece storage for storing the workpiece W is provided on the mount surface of the robot mount carriage 10 on which the robot 11 is mounted. This configuration enables the movable carriage 20 of the robot mount carriage 10 to be compact, so that the convenience of handling of the robot mount carriage 10 is improved and the equipment cost for the robot mount carriage 10 is reduced.

Further, in the robot mount carriage 10 in this embodiment, the wheels 22, 23 are grounded on the floor surface with the jacks 26 moved upward from the floor surface by the elevating mechanism 30 to allow the robot mount carriage 10 to move. On the other hand, the jacks 26 are pressed against the floor surface with the wheels 22, 23 moved upward to render the robot mount carriage 10 immovable with respect to the floor surface, whereby the robot in operation is stably supported.

Further, the wheels 22, 23 and the jacks 26 are arranged to mutually form an inverted triangle in plan view and the robot 11 is mounted on the movable carriage 20 so as to be located inside the triangle connecting the wheels 22, 23 and the triangle connecting the jacks 26 in plan view. This configuration enables the robot 11 to be stably supported both when the robot mount carriage 10 is moved by rolling of the wheels 22, 23 and when the jacks 26 are pressed against the floor surface and the robot mount carriage 10 is thereby rendered immovable with respect to the floor surface.

Above has been described an embodiment of the present invention. However, it should be noted that the present invention is not limited to the above-described embodiment and can be implemented in other manners.

For example, in the above-described embodiment, the pair of associators consists of the camera 15 and the identifier 55. However, the pair of associators for associating the robot mount carriage 10 and the workpiece storage carriage 50 with each other is not limited thereto. For example, a configuration is possible in which: the air nozzle 14 illustrated in FIGS. 3, 4, and 9 is used as an engaging body; an engaged body 56 having an engagement hole for inserting the air nozzle 14 therein is provided on the workpiece storage carriage 50 as illustrated in FIGS. 1 and 2; and the pair of associators consists of the air nozzle 14 and the engaged body 56.

In this configuration, after the robot mount carriage 10 and the workpiece storage carriage 50 are positioned at the preset positions with respect to the machine tool 100, the robot 11 is manually operated to insert the air nozzle 14 as the engaging body into the engagement hole of the engaged body 56 provided on the workpiece storage carriage 50. Subsequently, the controller 16 recognizes the positional relationship between the robot mount carriage 10 and the workpiece storage carriage 50 based on the posture of the robot 11 at present.

More specifically, the posture of the robot 11 when the air nozzle 14 is inserted into the engagement hole of the engaged body 56 in the teaching operation has previously been obtained. Thereafter, the posture of the robot 11 when the air nozzle 14 is inserted into the engagement hole of the engaged body 56 at present is obtained. Based on these postures, an error amount of the positional relationship between the robot 11 and the workpiece storage carriage 50 at present with respect to the positional relationship between the robot 11 and the workpiece storage carriage 50 in the teaching operation is calculated. Based on the calculated error amount, the controller 16 recognizes the positional relationship between the robot mount carriage 10 and the workpiece storage carriage 50. Thus, an association is established between the robot mount carriage 10 and the workpiece storage carriage 50 by the pair of associators that consists of the air nozzle 14 and the engaged body 56.

The controller 16 controls operation of the robot 11 with respect to the workpiece storage carriage 50 based on the thus-recognized positional relationship between the robot mount carriage 10 and the workpiece storage carriage 50. This configuration also enables the robot 11 to accurately operate with respect to the workpiece storage carriage.

Note that the above-described arrangement of the engaging body (air nozzle 14) and engaged body 56 exemplifies a relative arrangement. The engaged body 56 may be provided on the hand 13 of the robot 11 with an engaging body corresponding to the air nozzle 14 provided on the workpiece storage carriage 50.

Alternatively, the pair of associators may consist of a coupler 57 illustrated in FIGS. 2 and 12. The coupler 57 is constituted by an engaged block 58 and an engaging block 59. The engaged block 58 has two engagement holes 58*a*, while the engaging block 59 has two engagement projections 59*a* corresponding to the engagement holes 58*a*. One of the engaged block 58 and engaging block 59 is provided on a side surface of the robot mount carriage 10, while the other of the engaged block 58 and engaging block 59 is provided on a side surface of the workpiece storage carriage 50.

In this configuration, the robot mount carriage 10 and the workpiece storage carriage 50 are positioned at the present positions with respect to the machine tool 100 with the engagement projections 59*a* of the engaging block 59 inserted in the engagement holes 58*a* of the engaged block 58. The positional relationship between the robot mount carriage 10 and the workpiece storage carriage 50 is thereby determined.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

1 Workpiece supply system
10 Robot mount carriage
11 Robot
13 Hand
15 Camera
16 Controller
20 Movable carriage
21 Wheel frame
22 Fixed wheel
23 Free wheel
25 Jack frame
26 Jack
30 Elevating mechanism
31 Drive screw
32 Nut
34 Wheel
35 Transmission shaft
38 Lower wedge
39 Upper wedge
40 Connecting plate
41 Mount table
42 Support pillar
43 Handle
44 Covering body
45 Operation panel
50 Workpiece storage carriage
51 Handle
52 Wheel
53 Brake
54 Workpiece storage
55 Identifier
100 Machine tool
101 Door

The invention claimed is:

1. A workpiece supply system comprising:

a robot mount carriage including: a carriage having a plurality of wheels and configured to be manually moved; a robot mounted on the carriage; and a controller configured to control the robot; and a workpiece storage carriage having a plurality of wheels and configured to be manually moved and including a workpiece storage storing a workpiece, the robot mount carriage and the workpiece storage carriage being configured to supply the workpiece to a predetermined target device when disposed around the target device, wherein:

one of the robot mount carriage and workpiece storage carriage includes one of a pair of associators for associating the robot mount carriage and the workpiece storage carriage with each other; and another one of the robot mount carriage and workpiece storage carriage includes another one of the pair of associators, wherein the carriage of the robot mount carriage comprises:

three wheels arranged at predetermined intervals, three jacks arranged at predetermined intervals, a frame having the wheels and the jacks thereon, and a mount table arranged on the frame;

the robot is mounted on the mount table; and the wheels and the jacks are arranged so as to mutually form an inverted triangle in plan view.

2. The workpiece supply system according to claim 1, wherein:

the pair of associators comprises a camera provided on the robot and an identifier provided on the workpiece storage carriage;

the identifier has an identification figure; and the controller is configured to: drive the camera with the robot in a predetermined image capturing pose to cause the camera to capture an image of the identifier; analyze the captured image to recognize a positional relationship between the robot mount carriage and the workpiece storage carriage; and control operation of the robot with respect to the workpiece storage carriage based on the recognized positional relationship.

3. The workpiece supply system according to claim 1, wherein:

the pair of associators comprises an engaged body and an engaging body engageable with the engaged body, the engaged body is provided on one of the robot and workpiece storage carriage and the engaging body is provided on another one of the robot and workpiece storage carriage; and the controller is configured to: drive the robot to recognize a positional relationship between the robot mount carriage and the workpiece storage carriage based on a posture of the robot when the engaged body and the engaging body are brought into engagement with each other;

and control operation of the robot with respect to the workpiece storage carriage based on the recognized positional relationship.

4. The workpiece supply system according to claim 1, wherein no workpiece storage for storing the workpiece is provided on a mount surface of the carriage of the robot mount carriage on which the robot is mounted.

5. A workpiece supply system comprising:

a robot mount carriage including: a carriage having a plurality of wheels and configured to be manually moved; a robot mounted on the carriage; and a controller configured to control the robot; and a workpiece storage carriage having a plurality of wheels and configured to be manually moved and including a workpiece storage storing a workpiece, the robot mount carriage and the workpiece storage carriage being configured to supply the workpiece to a predetermined target device when disposed around the target device, wherein:

one of the robot mount carriage and workpiece storage carriage includes one of a pair of associators for associating the robot mount carriage and the workpiece storage carriage with each other; and another one of the robot mount carriage and workpiece storage carriage includes another one of the pair of associators;

the carriage of the robot mount carriage comprises:

three wheels arranged at predetermined intervals;

a wheel frame having the wheels thereon;

three jacks arranged at predetermined intervals;

a jack frame having the jacks thereon; and a mount table for mounting the robot thereon;

a first one of the wheel frame and jack frame is arranged on a second one of the wheel frame and jack frame via an elevating mechanism;

the mount table is arranged on the first one of the wheel frame and jack frame;

when the wheel frame is moved downward by the elevating mechanism, the wheels are brought into contact with a floor surface and the jacks are separated upward from the floor surface;

when the wheel frame is moved upward by the elevating mechanism, the wheels are separated upward from the floor surface and the jacks are brought into contact with the floor surface; and the wheels and the jacks are arranged so as to mutually form an inverted triangle in plan view.

6. The workpiece supply system according to claim 1, wherein the robot is mounted on the carriage so as to be located inside a triangle connecting the wheels and a triangle connecting the jacks in plan view.

7. The workpiece supply system according to claim 5, wherein the robot is mounted on the carriage so as to be located inside a triangle connecting the wheels and a triangle connecting the jacks in plan view.

* * * * *